J. J. CROOKE.
Refining Lead.

No. 50,800. Patented Nov. 7, 1865.

Witnesses:
Chas K. Walker
Chas H Leonard

Inventor:
John J. Crooke
by his attorney
E. S. Renwick

UNITED STATES PATENT OFFICE.

JOHN J. CROOKE, OF NEW YORK, N. Y.

IMPROVEMENT IN REFINING LEAD.

Specification forming part of Letters Patent No. 50,800, dated November 7, 1865.

*To all whom it may concern:*

Be it known that I, JOHN JOSEPH CROOKE, of the city, county, and State of New York, have invented a new and useful Improvement in the Art of Refining Lead; and I do hereby declare that the following is a full, clear, and exact description of my said invention, reference being had to the accompanying drawings, in which—

Figure 1:
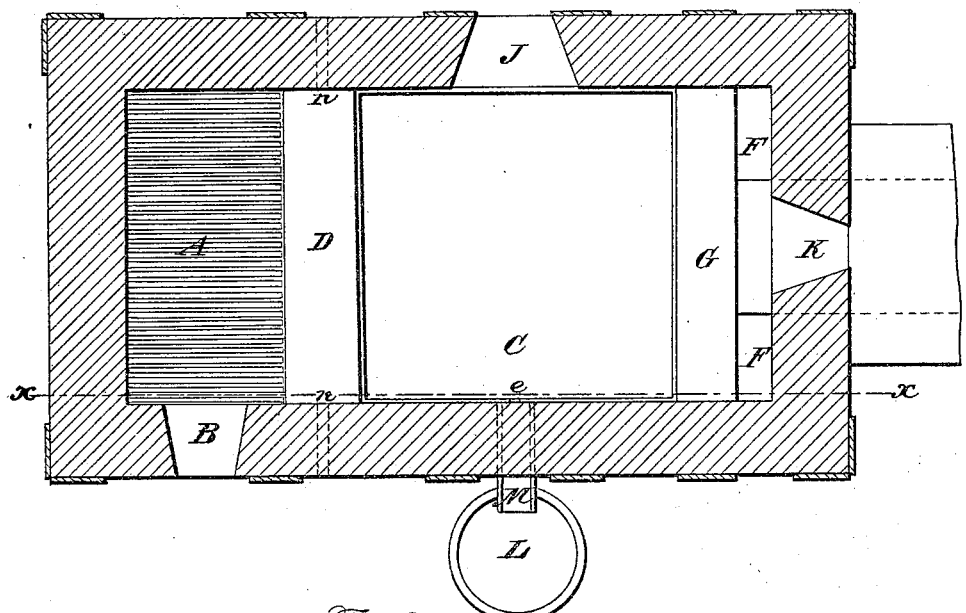
Figure 2:
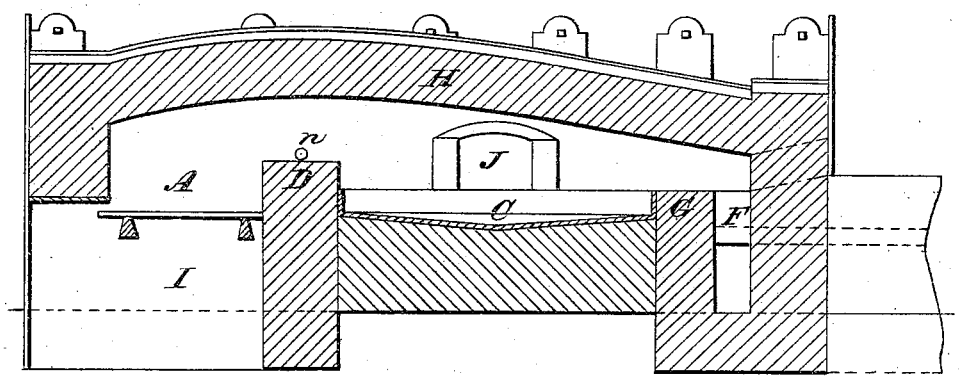

Figure 1 represents a plan of a furnace used in practicing my invention, with the roof removed to show its interior; and Fig. 2 represents a vertical longitudinal section at the line *x x* of Fig. 1.

The object of my invention is to refine the hard leads of commerce, which consist substantially of lead alloyed with one or more of the following foreign metals—viz., antimony, copper, tin, and zinc. The process in use for this purpose previous to my invention is to oxidize the foreign metals by exposing the melted impure metal to the action of a current of air, and to skim off the pellicle of oxide as fast as it forms, thereby exposing a fresh surface of the melted metal to the action of the air, the operation being continued until all the foreign metals have been oxidized. This process of refining or purifying lead is exceedingly tedious, laborious, and consequently costly, and it frequently requires several days for its completion.

My improvement consists in treating the impure metal in a melted state with the oxide of lead, called "litharge," also melted, whereby the foreign metals are rapidly oxidized, and their oxides are taken up by the litharge, leaving the lead practically pure. The operation may be conveniently performed in the hearth of a reverberatory furnace, and the litharge may either be charged into the furnace or may be obtained by the oxidation of a portion of the lead under treatment.

The furnace represented in the accompanying drawings is a suitable one for practicing my process. It has a fire-box, A, fitted with grate-bars for the fuel, and a fire-hole, B, for the introduction of the fresh fuel. It has also a sole or hearth, C, having the form of a shallow pan, and made, by preference, of cast-iron, in one piece, so that there are no crevices through which the melted metal can escape.

The deepest part of the pan has a tap-hole at *e* formed in it to permit the refined lead to be discharged. The hearth is separated on one side from the fire-box by a fire-bridge, D, and at the opposite side it is separated from the flues F F leading to the chimney, by a flue-bridge G.

The furnace is covered by a roof, H, and has an ash-pit, I, beneath the fire-box. The body of the furnace is provided with openings J K for the introduction of the lead to be treated, and of tools, and these openings are fitted with doors.

At the back of the furnace there is a basin, L, into which the melted scoria from the refined metal is conducted from the tap-hole by means of a gutter, M.

Openings *n n* for the introduction of atmospheric air are formed in the sides of the furnace, so that the air entering thereat can mix with the products of the combustion of the fuel.

The fuel used in the furnace is, by preference, anthracite coal, and the furnace should be brought to a bright red heat before the impure lead is charged into it. The tap-hole is closed with a plug of iron covered with clay, and a quantity of the impure lead sufficient when melted to fill the hearth nearly to the upper edge of the iron pan is introduced through the doors. The operation then proceeds as follows when the litharge is to be derived from the lead under treatment: The lead melts and attains a red heat, and a black pellicle composed of the oxides of the foreign metals in alloy with the lead forms upon its surface. Under the old process the pellicle was skimmed off continually, but in practicing my improvement nothing is done to this pellicle. The pellicle therefore gradually becomes thicker, and presently oxide of lead begins to form. As it forms a portion of it parts with its oxygen to the other metals, thereby furthering their oxidation, and the resulting reduced lead returns to the mass of melted metal. The remainder of the oxide of lead melts and dissolves the oxides of the foreign metals, so that the mass of molten metal becomes covered with a fluid scoria of the oxides of the mixed metals. The operation is continued until all the foreign metals originally mixed with the lead have become oxidized and the molten lead beneath the scoria is purified of them. When this point is reached, which can be easily determined by dipping a small sample of lead out of the furnace and testing it in the usual manner, the tap-hole is opened and the lead is discharged into the basin, from which it is ladled out and poured into molds. Then the scoria is withdrawn from the furnace through the working-door by means of a large shovel, after which a new charge of impure lead is introduced into the furnace, and the operation proceeds as before.

The furnace used may be of sufficient capacity to hold from two to four tons of impure lead, and care should be taken to have the charge when melted fill the pan as nearly to the brim as possible, so as to protect the iron from the flame and from the action of the melted litharge.

The time required to refine a charge of impure lead containing from five to ten per cent. of foreign metals is from one to three hours, depending upon the quantity treated and upon the dimensions of the furnace. When the litharge is charged into the furnace with the impure lead, from ten to twenty per cent. of the weight of the charge is generally sufficient to refine the ordinary hard leads found in the market, and the litharge may be in the form of the impure oxide or lead dross. The operation then does not require so long a time, but the process is not as economical at the present prices of lead and litharge. The scoria produced, which consists of the oxides of lead and the foreign metals, may afterward be treated so as to recover the lead and the other metals; but this forms no part of the subject-matter of this patent.

I do not claim the furnace employed by me, nor do I claim to have discovered that melted litharge will oxidize certain metals and dissolve their oxides, as I am well aware that it acts in this manner in the process of cupellation; but I have discovered that this property of litharge may be rendered available for the refining of impure lead.

What, therefore, I claim as my invention, and desire to secure by Letters Patent, is—

The improved process of refining impure lead by treating it while melted with the melted oxide of lead, substantially in the manner hereinbefore set forth.

In testimony whereof I have hereunto set my hand this 7th day of September, A. D. 1865.

JOHN J. CROOKE.

Witnesses:
   E. S. REMVICK,
   MELVILLE BIGGS.